(12) United States Patent
Zhao

(10) Patent No.: US 8,934,258 B2
(45) Date of Patent: Jan. 13, 2015

(54) MOTOR CONTROLLER

(71) Applicant: Zhongshan Broad-Ocean Motor Co., Ltd., Zhongshan (CN)

(72) Inventor: Yong Zhao, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 154 days.

(21) Appl. No.: 13/781,704

(22) Filed: Feb. 28, 2013

(65) Prior Publication Data

US 2013/0175967 A1 Jul. 11, 2013

Related U.S. Application Data

(63) Continuation-in-part of application No. PCT/CN2011/073077, filed on Apr. 20, 2011.

(51) Int. Cl.
*H05K 1/18* (2006.01)
*H02P 25/16* (2006.01)
*H02P 6/08* (2006.01)

(52) U.S. Cl.
CPC . *H02P 25/16* (2013.01); *H02P 6/08* (2013.01)
USPC ........... 361/764; 361/719; 361/720; 361/761; 438/128; 439/55; 439/493; 323/260; 318/801

(58) Field of Classification Search
USPC ............ 318/560, 721, 799, 801, 432; 363/40, 363/55, 95, 102, 109, 174, 175; 438/128; 439/55, 493; 323/260; 361/719, 720, 361/761, 764
See application file for complete search history.

(56) References Cited

U.S. PATENT DOCUMENTS 6,194,856 B1 * 2/2001 Kobayashi et al. ........... 318/432

* cited by examiner

*Primary Examiner* — Antony M Paul
(74) *Attorney, Agent, or Firm* — Matthias Scholl P.C.; Matthias Scholl

(57) ABSTRACT

A motor controller comprising multiple types of interfaces assigned automatically, including a mother circuit board and a daughter circuit board. The daughter circuit board is plugged into the mother circuit board to form electric connection. The mother circuit board has a power circuit, a microprocessor unit of the mother circuit board, a rotor position sensing unit, a power inverter unit, and an analog sensing unit. The daughter circuit board includes a signal interface circuit. The mother circuit board further has a serial digital communication unit. The signal interface circuit includes a microprocessor of the daughter circuit board, and a serial digital communication unit of the daughter circuit board. The microprocessor unit of the mother circuit board communicates with the microprocessor of the daughter circuit board via the serial digital communication unit of the mother circuit board and the serial digital communication unit of the daughter circuit board.

10 Claims, 7 Drawing Sheets

US 8,934,258 B2

MOTOR CONTROLLER

CROSS-REFERENCE TO RELATED APPLICATIONS

This application is a continuation-in-part of International Patent Application No. PCT/CN2011/073077 with an international filing date of Apr. 20, 2011, designating the United States, now pending, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 14781 Memorial Drive, Suite 1319, Houston, Tex. 77079.

BACKGROUND OF THE INVENTION

1. Field of the Invention

The invention relates to a motor controller comprising multiple types of interfaces assigned automatically.

2. Description of the Related Art

As shown in FIGS. 1 and 2, a conventional ECM includes a main body and a controller. The main body has a stator assembly and a rotor assembly. The controller should correspond with both the main body and a control interface of a control system of a user terminal. Different control systems of user terminals correspond with different control signals. For example, both a control system of an air-conditioner and a control system of a washing-machine belong to control system of user terminals, but the control signals thereof are completely different. Conventionally, for each specific control system of a user terminal, a motor and a controller thereof are developed accordingly, which, however, brings about the following disadvantages: 1) a variety of motors have to be manufactured, which results in inconvenient management and standardization; 2) the development for motors takes time and increases the production costs; and 3) the newly-developed motor has a narrow application scope and is inconvenient for popularization.

To solve the above-described problems, a motor controller including a mother circuit board and a daughter circuit board butted therewith has been introduced. Main functional circuits of the motor controller are disposed on the mother circuit board. Different interface circuit units and identify circuits are disposed on different daughter circuit boards. When one daughter circuit board is butted with the mother circuit board, the identify circuit of the daughter circuit board sends messages to a central control and process unit of the mother circuit board. Thereafter, the central control and process unit automatically assigns an input/output port for the daughter circuit board. Thus, through cooperation with various daughter circuit boards, the motor controller can be applied to various occasions, i.e., has a wide application. Consequently, the motor manufactures do not need to produce a large number of motors, thereby reducing the management and development costs, simplifying the production process, and improving the efficiency.

Specifically, as shown in FIGS. 3-5, a motor controller includes a microprocessor unit, a signal interface unit, and an identify circuit. The microprocessor unit is disposed on a mother circuit board. The signal interface unit and the identify circuit are disposed on a daughter circuit board. The mother circuit board and the daughter circuit board are butted with each other to form an electric connection. The identify circuit inputs an identify signal to the microprocessor unit, and then the microprocessor unit automatically assigns an input/output port for the signal interface unit according to the identify signal.

Identify circuits corresponding with different signal interface units output different signals, thereby forming different daughter circuit boards. An output end of the microprocessor unit is connected to a power inverter unit. An input end of the microprocessor unit is connected to an output end of a rotor position sensing circuit. The power inverter unit and the rotor position sensing unit are disposed on the mother circuit board. A power supply circuit and an analog sensing unit are also disposed on the mother circuit board. The analog sensing unit detects currents, voltages, and analog signals like NTC of the mother circuit lines on the mainboard. The power supply circuit supplies power to all the circuits. The microprocessor unit is a CPU, a micro control unit (MCU), or a digital signal processor (DSP). A port 3 is disposed on the mother circuit board and includes eleven terminal lugs E, N, L, M1, M2, M3, M4, M5, M6, M7, and M8, of which, the terminal lugs E, N, L are inputs of power supply, M1, M2, M3, M4, M5, M6, M7, M8 are interface signals output from the control system of the user terminal to daughter circuit boards. There may be a plurality of daughter circuit boards. A slot 1 is disposed on the mother circuit board, and a plug connector 2 is disposed on the daughter circuit board. The plug connector 2 is received in the slot 1 thereby electrically connecting the daughter circuit board with the mother circuit board.

However, disadvantages exist in applications are summarized below: 1) the design of mother circuit board plus daughter circuit board is employed, in which different daughter circuit boards are required to match with different applications from the same or different factories, the daughter circuit board not only has bad compatibility and multiple types, which results in high production cost and management cost, but also it can't be flexibly suitable to different environment; 2) when too many signals interfaces are employed, multiple electric isolations must be designed between daughter circuit boards and the mother circuit board, thereby resulting in complicated circuits and high production cost; and 3) interface signals require too much resource of the microprocessor unit MCU of the mainboard to process, thereby affecting the running speed.

SUMMARY OF THE INVENTION

In view of the above-described problems, it is one objective of the invention to provide a motor controller comprising multiple types of interfaces assigned automatically which has good compatibility and flexible usage, can preset interface signals in a way of software, and reduce types of daughter circuit boards and the costs of production and management.

To achieve the above objective, in accordance with one embodiment of the invention, there provided is a motor controller comprising multiple types of interfaces assigned automatically comprises a mother circuit board and a daughter circuit board. The daughter circuit board is plugged into the mother circuit board to form an electric connection. The mother circuit board comprises a power circuit, a microprocessor unit of the mother circuit board, a rotor position sensing unit, a power inverter unit, and an analog sensing unit. The daughter circuit board comprises a signal interface circuit. The power circuit supplies power to other circuits. The analog sensing unit and the rotor position sensing unit input detection signals to the microprocessor unit of the mother circuit board. The microprocessor unit of the mother circuit board inputs control signals to the power inverter unit. The microprocessor unit of the mother circuit board communicates with an outside via the signal interface circuit. The signal interface circuit comprises a microprocessor of the daughter circuit board, and a serial digital communication unit of the daughter circuit board; the mother circuit board further comprises a serial digital communication unit of the mother circuit board. The microprocessor unit of the mother circuit board communicates with the microprocessor of the daughter circuit board via the serial digital communication unit of the mother circuit board and the serial digital communication unit of the daughter circuit board.

In a class of this embodiment, the microprocessor of the daughter circuit board communicates with a control system of a user terminal.

In a class of this embodiment, the microprocessor of the daughter circuit board processes a plurality of switch signals, digital signals, pulses, and analogs.

In a class of this embodiment, the microprocessor unit of the mother circuit board communicates with the microprocessor of the daughter circuit board in a mode of serial digital message for transmission of interface signals.

In a class of this embodiment, the microprocessor of the daughter circuit board presets the type and size of interface signals by amending software.

In a class of this embodiment, the microprocessor unit of the mother circuit board and the microprocessor of the daughter circuit board are micro controller units (MCU).

Advantages of the invention are summarized below:
1) the signal interface circuit is improved in the invention compared with that of the prior arts as follows: the signal interface circuit comprises a microprocessor of the daughter circuit board, and a serial digital communication unit of the daughter circuit board; the mother circuit board further comprises a serial digital communication unit of the mother circuit board; the microprocessor unit of the mother circuit board communicates with the microprocessor of the daughter circuit board via the serial digital communication unit of the mother circuit board and the serial digital communication unit of the daughter circuit board; the microprocessor of the daughter circuit board communicates with the control system of the user terminal. Thus, the microprocessor of the daughter circuit board can preset the type of interface signals via amending software, thereby highly increasing the compatibility of the daughter circuit board, reducing the species of the daughter circuit boards and the cost of the production and management, and shortening the development cycle.
2) in the prior art, between 6 and 8 photoelectric isolation devices are employed between the daughter circuit board and the mother circuit board; in this invention, the microprocessor unit of the mother circuit board communicates with the microprocessor of the daughter circuit board in a way of digital communications, through which many signals are passing, thus, only 2 electrical isolations are used in the invention, which is beneficial to simplify the structure of the circuit, and to lower the production cost; and
3) interface signals of the invention are first processed by the microprocessor of the daughter circuit board, and then transmitted to the microprocessor unit of the mother circuit board, during which, the interface signals rarely use the resource of the microprocessor unit of the mother circuit board, thus improving the running speed.

DETAILED DESCRIPTION OF THE EMBODIMENTS

For further illustrating the invention, experiments detailing a motor controller are described below. It should be noted that the following examples are intended to describe and not to limit the invention.

Figure 1:
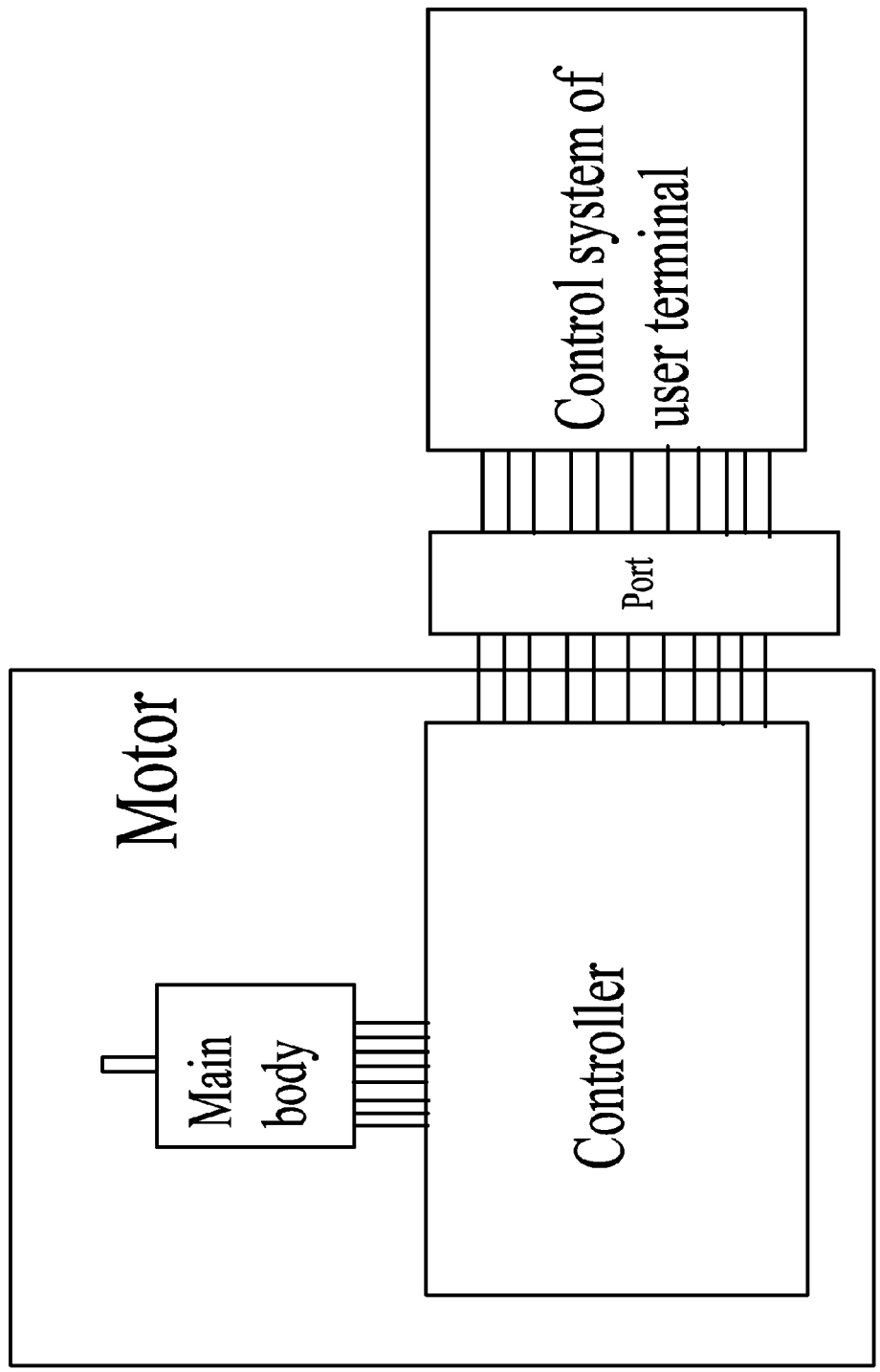
FIG. 1 is a schematic diagram of connection between a motor controller and a control system of a user terminal in the prior art.
Figure 2:
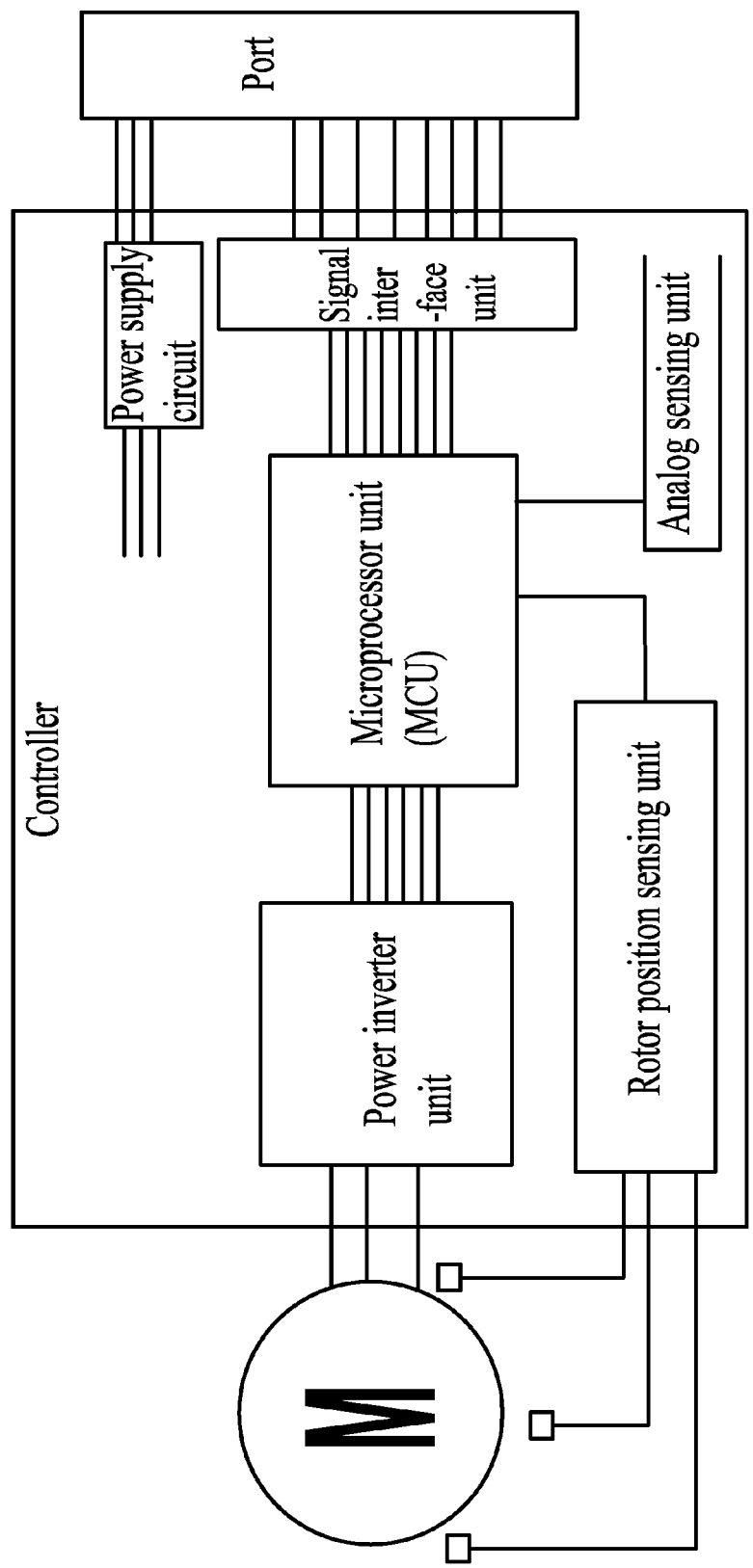
FIG. 2 is a block diagram of a motor controller in the prior art.
Figure 3:
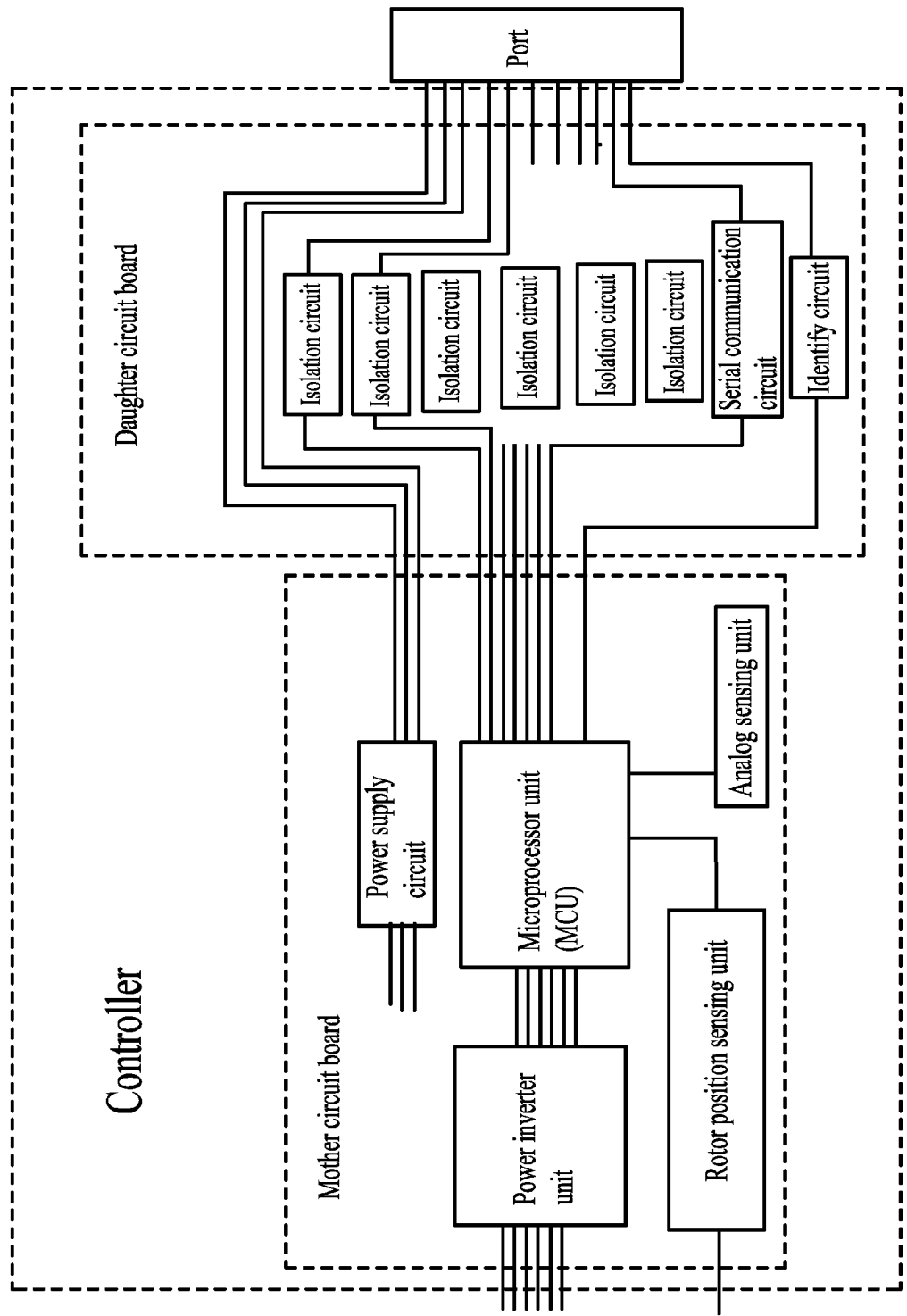
FIG. 3 is a schematic diagram of a motor controller having a mother and a daughter circuit board in the prior art.
Figure 4:
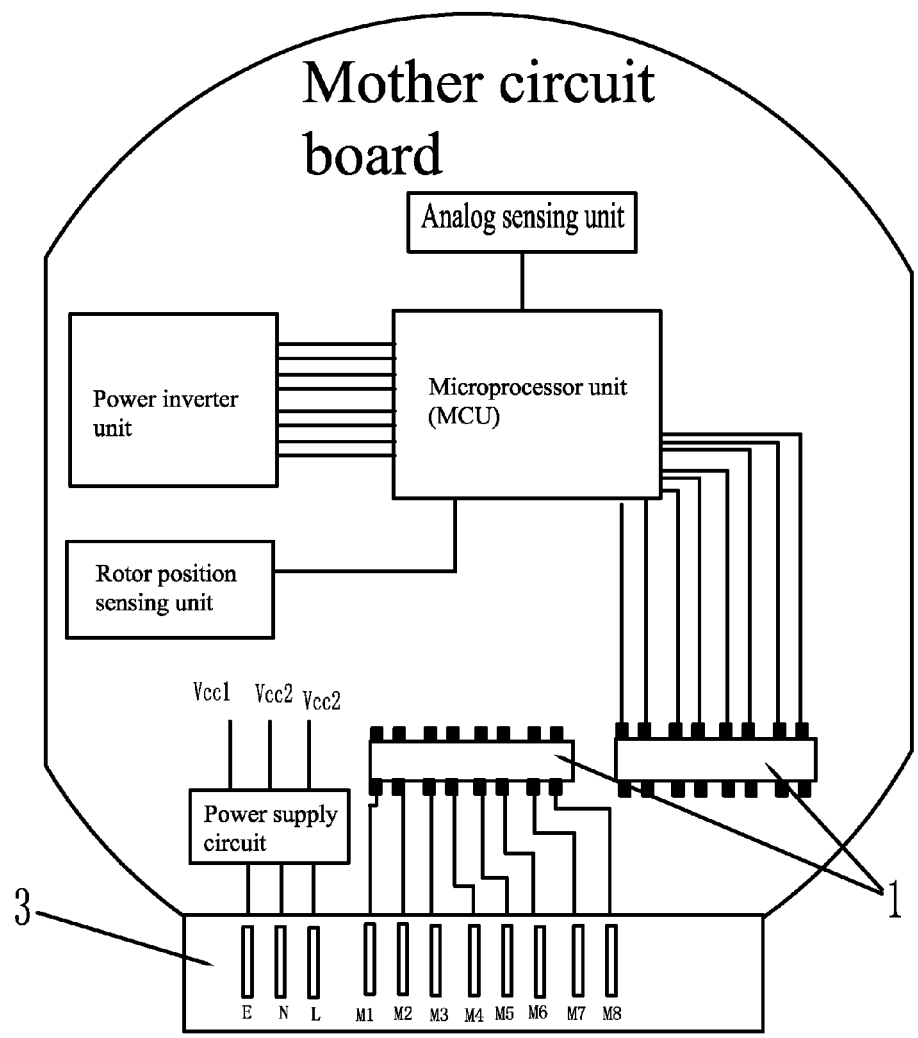
FIG. 4 is a schematic diagram of a mother circuit board of a motor controller in the prior art.
Figure 5:
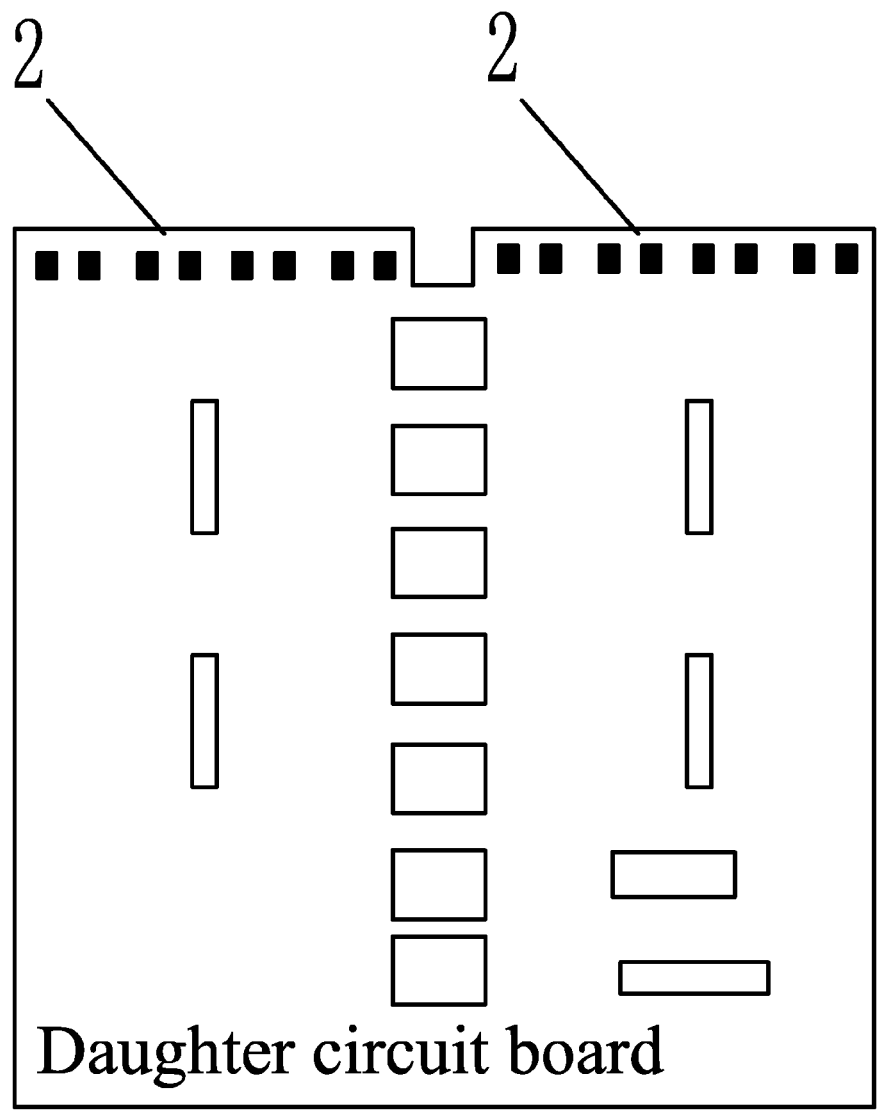
FIG. 5 is a schematic diagram of a daughter circuit board of a motor controller in the prior art.
Figure 6:
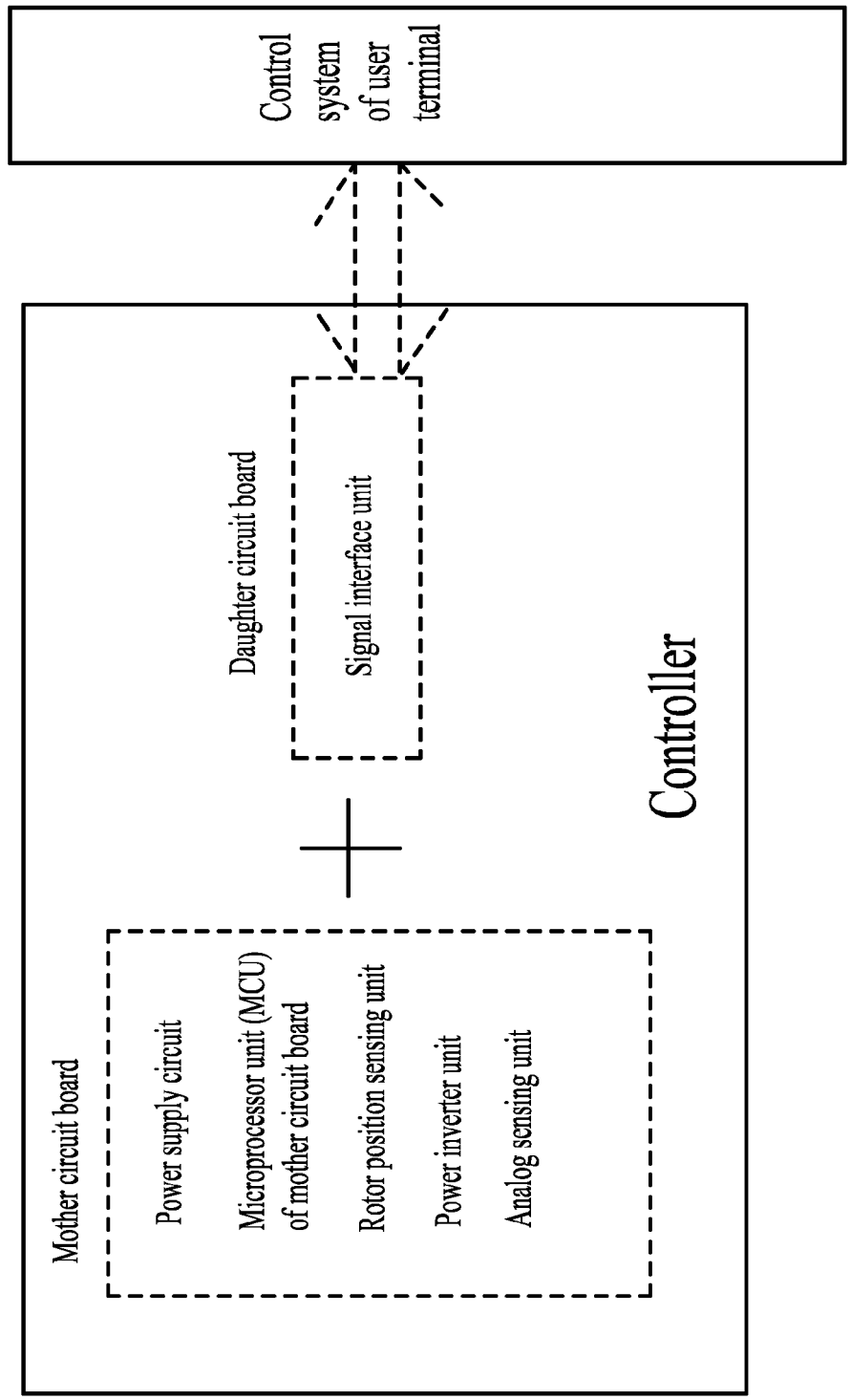
FIG. 6 is a block diagram of a motor controller comprising multiple types of interfaces assigned automatically in accordance with one embodiment of the invention.
Figure 7:
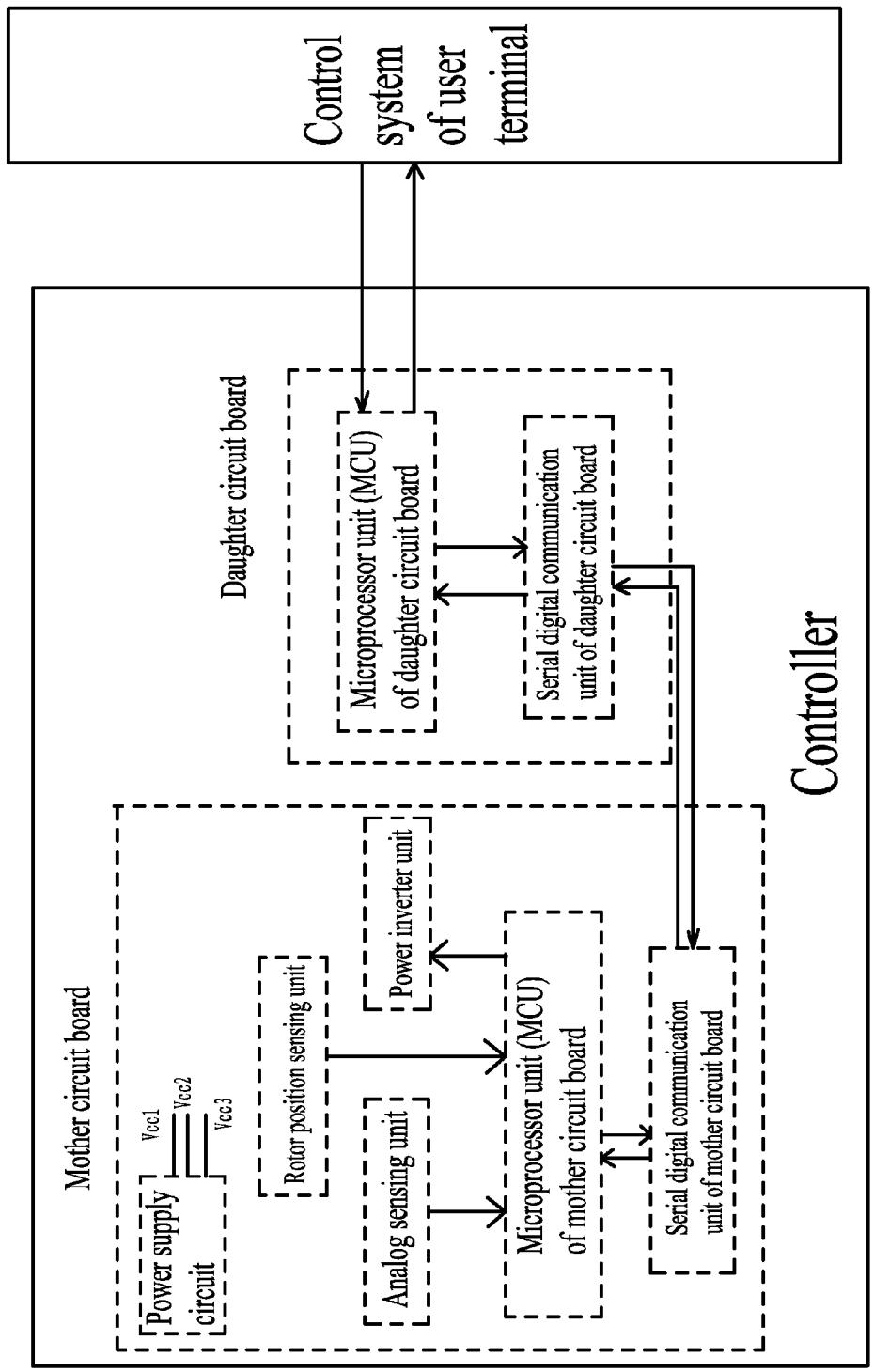
FIG. 7 is a specific block diagram of FIG. 6

As shown in FIGS. 6 and 7, a motor controller comprising multiple types of interfaces assigned automatically comprises a mother circuit board and a daughter circuit board. The daughter circuit board is plugged into the mother circuit board to form an electric connection. The mother circuit board comprises a power circuit, a microprocessor unit of the mother circuit board, a rotor position sensing unit, a power inverter unit, and an analog sensing unit. The daughter circuit board comprises a signal interface circuit. The power circuit supplies power to other circuits. The analog sensing unit and the rotor position sensing unit input detection signals to the microprocessor unit of the mother circuit board. The microprocessor unit of the mother circuit board inputs control signals to the power inverter unit. The microprocessor unit of the mother circuit board communicates with an outside via the signal interface circuit. The signal interface circuit comprises a microprocessor of the daughter circuit board, and a serial digital communication unit of the daughter circuit board. The mother circuit board further comprises a serial digital communication unit of the mother circuit board, and the microprocessor unit of the mother circuit board communicates with the microprocessor of the daughter circuit board via the serial digital communication unit of the mother circuit board and the serial digital communication unit of the daughter circuit board. The microprocessor of the daughter circuit board communicates with a control system of a user terminal. The microprocessor of the daughter circuit board processes a plurality of switch signals, digital signals, pulses, and analogs. The microprocessor unit of the mother circuit board communicates with the microprocessor of the daughter circuit board in a mode of serial digital message for transmission of interface signals. The microprocessor of the daughter circuit board presets the type and size of interface signals by amending software. The microprocessor unit of the mother circuit board and the microprocessor of the daughter circuit board are micro controller units (MCU).

Working principles of the invention: according to the types of the interface information between the motor controller and the control system of a user terminal, the types of interface information can be preset by the software of the microprocessor of the daughter board, while the circuit structure of the daughter circuit board is maintained, thereby acquiring a good compatibility and flexible usage, reducing the types of the daughter circuit boards and the costs of management and production, and shortening the development cycle.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A motor controller, comprising:
a mother circuit board; and
a daughter circuit board;
wherein
the daughter circuit board is plugged into the mother circuit board to form an electric connection;
the mother circuit board comprises a power circuit, a microprocessor unit of the mother circuit board, a rotor position sensing unit, a power inverter unit, and an analog sensing unit;
the daughter circuit board comprises a signal interface circuit;
the power circuit supplies power to other circuits, the analog sensing unit and the rotor position sensing unit input detection signals to the microprocessor unit of the mother circuit board, the microprocessor unit of the mother circuit board inputs control signals to the power inverter unit, and the microprocessor unit of the mother circuit board communicates with an outside via the signal interface circuit;
the signal interface circuit comprises a microprocessor of the daughter circuit board, and a serial digital communication unit of the daughter circuit board; and
the mother circuit board further comprises a serial digital communication unit of the mother circuit board, and the microprocessor unit of the mother circuit board communicates with the microprocessor of the daughter circuit board via the serial digital communication unit of the mother circuit board and the serial digital communication unit of the daughter circuit board.

2. The motor controller of claim 1, wherein the microprocessor of the daughter circuit board communicates with a control system of a user terminal.

3. The motor controller of claim 2, wherein the microprocessor of the daughter circuit board processes a plurality of switch signals, digital signals, pulses, and analogs.

4. The motor controller of claim 2, wherein the microprocessor unit of the mother circuit board communicates with the microprocessor of the daughter circuit board in a mode of serial digital message for transmission of interface signals.

5. The motor controller of claim 2, wherein the microprocessor of the daughter circuit board presets the type and size of interface signals by amending software.

6. The motor controller of claim 2, wherein the microprocessor unit of the mother circuit board and the microprocessor of the daughter circuit board are micro controller units (MCU).

7. The motor controller of claim 1, wherein the microprocessor of the daughter circuit board processes a plurality of switch signals, digital signals, pulses, and analogs.

8. The motor controller of claim 1, wherein the microprocessor unit of the mother circuit board communicates with the microprocessor of the daughter circuit board in a mode of serial digital message for transmission of interface signals.

9. The motor controller of claim 1, wherein the microprocessor of the daughter circuit board presets the type and size of interface signals by amending software.

10. The motor controller of claim 1, wherein the microprocessor unit of the mother circuit board and the microprocessor of the daughter circuit board are micro controller units (MCU).

* * * * *